United States Patent [19]

Watanabe

[11] 3,882,362

[45] May 6, 1975

[54] DEVICE FOR PREVENTING OSCILLATION OF LRC CIRCUIT

[75] Inventor: Sakuji Watanabe, Urawa, Japan

[73] Assignee: Nippon Kogaku K.K., Tokyo, Japan

[22] Filed: Nov. 26, 1973

[21] Appl. No.: 419,044

[30] Foreign Application Priority Data

Nov. 30, 1972 Japan .............................. 47-119377

[52] U.S. Cl. .............. 317/123; 317/DIG. 6; 354/50

[51] Int. Cl. .............................................. H01f 7/18

[58] Field of Search ........ 318/615, 616; 333/70 CR, 333/79; 354/50, 51, 60; 317/DIG. 6

[56] References Cited

UNITED STATES PATENTS

| | | | |
|---|---|---|---|
| 1,931,660 | 10/1933 | Kautter | 333/79 X |
| 2,855,551 | 10/1958 | McCarty | 318/615 |
| 3,712,192 | 1/1973 | Ono et al. | 354/60 X |

*Primary Examiner*—J. D. Miller
*Assistant Examiner*—Harry E. Moose, Jr.
*Attorney, Agent, or Firm*—Fitzpatrick, Cella, Harper & Scinto

[57] ABSTRACT

A device for preventing the oscillation of an LRC circuit of an electronic shutter control circuit includes a control circuit and a converter. A low-pass filter is interconnected between a terminal of the control circuit, from which is derived a voltage for setting an exposure, and a terminal of the LRC circuit, thereby effecting the positive feedback of the oscillation signal of the LRC circuit. The low-pass filter includes resistors and a diode connected in series and a capacitor, one terminal of which is connected to the juncture of the resistors.

5 Claims, 2 Drawing Figures

DEVICE FOR PREVENTING OSCILLATION OF LRC CIRCUIT

BACKGROUND OF THE INVENTION

1. Field of the Invention

This invention relates to circuitry for an electronic shutter control system, and more particularly to means for preventing oscillation of an LRC circuit for such mechanism.

2. Description of the Prior Art

In a prior art electronic shutter control system, including an LRC circuit, a capacitor is inserted on the input or output side of the circuit in order to eliminate the effect of high frequency noise produced when a flash bulb or strobe lamp is triggered so that the erratic operation of the electronic shutter may be prevented.

However, when a shutter speed is relatively low, oscillation of the LRC circuit occurs because of variations in internal resistance of a battery caused by temperature variations and aging so that operation of an electromagnet for driving the shutter would be adversely effected. For example, the deenergization of the electromagnet may be delayed due to such oscillations, thus resulting in a delayed closing of the shutter.

SUMMARY OF THE INVENTION

I have conceived means by which I am able to eliminate the above drawback of the prior art. Essentially, I provide a low-pass filter interconnected between a terminal of the control circuit, from which a voltage for setting an exposure is derived, and a terminal of the LRC circuit so that the positive feedback of the oscillation signal of the LRC circuit is effected.

According to one aspect of my invention, the low-pass filter comprises series connected resistors and a diode and condenser connected between the resistors.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENT

Figure 1:
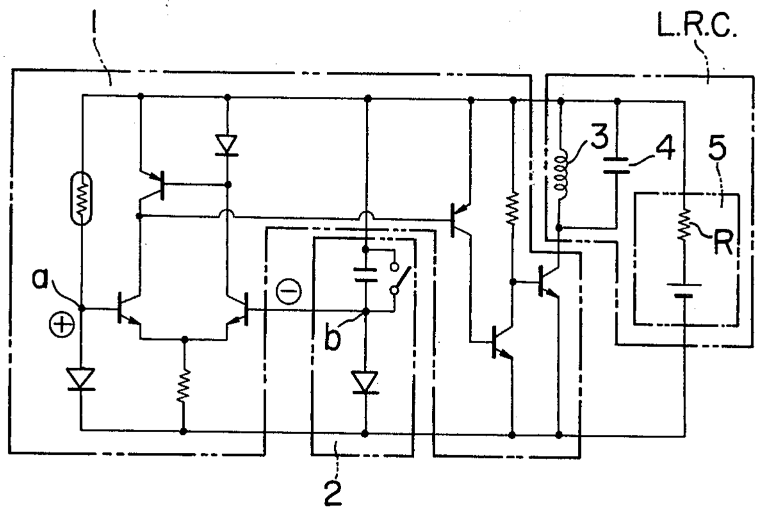
FIG. 1 is a circuit diagram illustrating an electronic shutter control circuit of the prior art having an LRC circuit.

FIG. 1 shows an electronic shutter control circuit, as described before, having an LRC circuit in which the numeral 4 designates the condenser which may be connected to either the input or output of the circuit for preventing the erroneous operation of the shutter due to a significant instantaneous noise from the flash or strobe lamp or the like. Numeral 5 is a power source having an internal resistance R, and numeral 3 designates an electromagnet.

Figure 2:
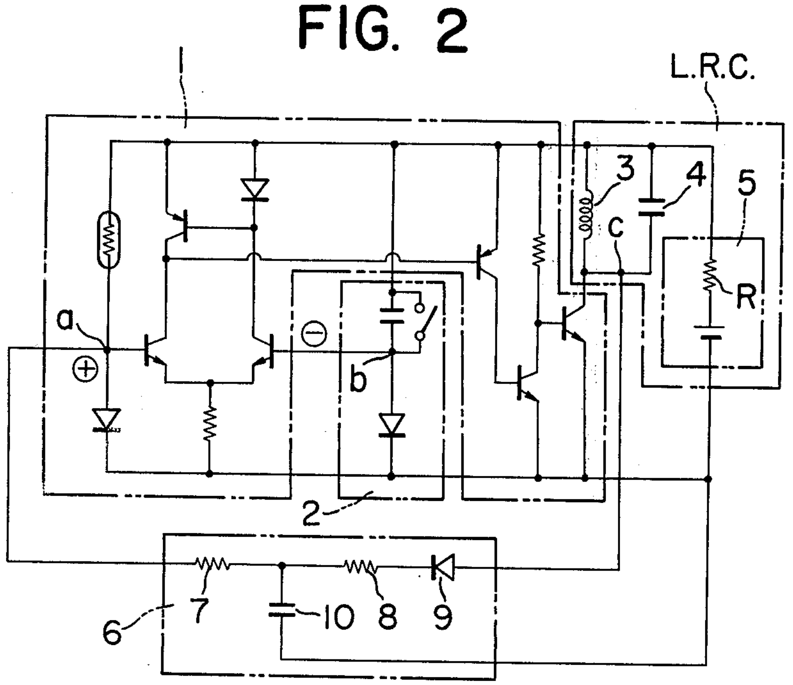
FIG. 2 illustrates an electric circuit of an embodiment of the present invention.

FIG. 2 illustrates a preferred embodiment of the present invention wherein the shutter control circuit 1, includes a voltage setting circuit, a voltage comparator, an electromagnet driving circuit and so on. When the voltage at the terminal *b* of a converter 2, which converts a shutter time into a voltage, becomes lower than the voltage at the terminal *a* of the control circuit 1, the signal for energizing or de-energizing the electromagnet 3 is applied to an electromagnet 3 for driving the shutter. It will be appreciated that the voltage at the terminal *b* is a function of the shutter speed. A capacitor 4 is provided for preventing the effect of a flash or strobe bulk; and numeral 5 designates a power source having an internal resistance R. The component parts 3, 4 and 5 constitute an LRC circuit.

In order to release the shutter at the proper time, when such shutter release tends to be delayed as referred to above, an increased positive voltage can be applied to the terminal *a* to which the exposure setting voltage is applied. According to the invention a positive feedback voltage is coupled between terminals *c* and *a* for this purpose. However, the feedback path includes a low-pass filter for attenuating high frequency noise which may occur at terminal *c*, due to a flash bulb or strobe lamp, so that such high frequency noise will not influence the operation of the circuit by means of the positive feedback path.

When the control circuit 1 is actuated so that the LRC circuit oscillates and when high frequency noise is produced by a flash or strobe lamp, the voltage at the terminal *c* is approximately given by the equation:

$$V \doteqdot Ao \{ \sin (Wot + \phi o) + \frac{1}{2} \} U(t - To) + \sum_{n=1}^{n} An \sin (Wnt + \phi n) \{ U(t - T) - U(t - T - \frac{2\pi}{W1}) \} \quad \ldots\ldots\ldots (1)$$

where

Wo-angular frequency of oscillation of LRC circuit;

Ao=amplitude;

$W1, W2, \ldots, Wn$ ($Wi < Wi+1$)=angular frequencies of the flash or strobe induction frequency components;

$A1, A2, \ldots, An$ = amplitudes thereof;

$\phi o$ = phase difference when LRC circuit oscillates;

$To$ = time when the control circuit is actuated;

$\phi 1, \ldots, \phi n$ = phase differences with respect to the angular frequencies $W1, \ldots, Wn$;

$T$ = time when flash or strobe is triggered; and $U(T)$ = unit step function.

The low-pass filter 6 of the present invention must be so designed as to have little effect on the component Wo of the first term of Eq. 1, but to sufficiently attenuate the maximum component $Wk$ ($1 \leqq k \leqq n$) of the second term of Eq. 1.

A low-pass filter 6 which is connected between terminals *a* of control circuit 1 and terminal *c* of the LRC circuit, satisfies the above condition. The low-pass filter 6 comprises an integrator consisting of a resistor 8 and a capacitor 10, a resistor 7 for attenuating the oscillation signal of the LRC circuit before it is applied to the terminal *a* of the control circuit 1, and a diode 9 for opening the circuit between the terminals *a* and *c* when the electromagnet 3 is energized but facilitates the operation of the integrator when the electromagnet 3 is de-energized.

As is evident from an analysis of FIGS. 1 and 2 the electromagnet 3 is deenergized when the collector current through the drive transistor connected thereto is cut-off. This occurs when the two transistors coupled to the drive transistor are driven into full conduction in response to an increase in collector current through the transistor having its base electrode coupled to terminal *a*. Such an increase in collector current will occur when the charge across the capacitor connected to terminal *b* approaches a predetermined value. Furthermore, such an increase in collector current can be accelerated by a positive feedback signal applied to terminal *a* in response to positive going signals or the initiation of oscillations in the LRC circuit, thus accelerating the deenergization of the electromagnet.

Therefore, the low-pass filter 6 can accomplish the positive feedback of the signal for energizing the electromagnet 3 to the terminal *a* of the control circuit 1 without degrading the operation of the capacitor 4 which serves to attenuate the high frequency noise produced by the flash bulb or strobe, whereby oscillation of LRC circuit is prevented.

From the foregoing description, it will be appreciated that oscillation of the LRC circuit is prevented, and the electronic shutter circuit comprises one capacitor, one diode and two resistors so that it may be fabricated in a simple manner at a low cost.

I believe that the construction and operation of my novel shutter control circuit will now be understood and that the advantages thereof will be fully appreciated by those persons skilled in the art.

I claim:

1. In an improved shutter control circuit for an electronic shutter device including an electromagnet for energization to hold open a shutter curtain, a drive circuit for the electromagnet, a capacitor disposed in parallel circuit relation with the electromagnet for preventing high frequency noise from interfering with the operation of the electromagnet, a control circuit having an input and having an output connected to the drive circuit for generating first and second output signals for respectively energizing and deenergizing the electromagnet, and a battery power source connected to the electromagnet, the drive circuit and the control circuit, the improvement comprising:

positive feedback circuit means coupled between a junction of the electromagnet-capacitor circuit and an input to the control circuit, said positive feedback circuit including means for sensing the commencement of deenergization of the electromagnet and for developing a feedback voltage in response thereto for application to said control circuit for increasing said second output signal of the control circuit.

2. A shutter control circuit as set forth in claim 1, wherein said positive feedback circuit means further includes means for preventing the development of said feedback voltage in response to said high frequency noise.

3. A shutter control circuit as set forth in claim 2, wherein said means for preventing the development of said feedback voltage in response to said high frequency noise comprises a low-pass filter.

4. A shutter control circuit as set forth in claim 1, wherein said positive feedback circuit means comprises a diode having one electrode connected to said electromagnet-capacitor circuit, and a low-pass filter connected between said control circuit and the other electrode of said diode.

5. A shutter control circuit as set forth in claim 1, wherein said positive feedback circuit means includes means for isolating said electromagnet-capacitor circuit from said means for developing a feedback voltage when said electromagnet-capacitor circuit is oscillation free.

* * * * *